(12) United States Patent
Kirshenbaum et al.

(10) Patent No.: US 8,355,997 B2
(45) Date of Patent: Jan. 15, 2013

(54) METHOD AND SYSTEM FOR DEVELOPING A CLASSIFICATION TOOL

(75) Inventors: Evan R. Kirshenbaum, Mountain View, CA (US); George Forman, Port Orchard, WA (US); Shyam Sundar Rajaram, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 573 days.

(21) Appl. No.: 12/618,159

(22) Filed: Nov. 13, 2009

(65) Prior Publication Data

US 2011/0119208 A1    May 19, 2011

(51) Int. Cl.
*G06F 15/18* (2006.01)
*G06F 7/00* (2006.01)

(52) U.S. Cl. .......................................... 706/12; 707/705
(58) Field of Classification Search ........................ None
See application file for complete search history.

(56) References Cited

U.S. PATENT DOCUMENTS

| | | |
|---|---|---|
| 6,763,338 B2 | 7/2004 | Kirshenbaum |
| 6,823,323 B2 | 11/2004 | Forman |
| 6,839,680 B1 | 1/2005 | Liu et al. |
| 7,240,039 B2 | 7/2007 | Kirshenbaum |
| 7,406,452 B2 | 7/2008 | Forman |
| 7,415,445 B2 | 8/2008 | Forman |
| 7,437,334 B2 | 10/2008 | Forman |
| 7,437,338 B1 | 10/2008 | Forman |
| 7,502,767 B1 | 3/2009 | Forman |
| 7,558,766 B1 | 7/2009 | Forman |
| 7,593,903 B2 | 9/2009 | Forman |
| 7,668,789 B1 | 2/2010 | Forman |
| 7,720,781 B2 | 5/2010 | Forman |
| 2003/0101449 A1 | 5/2003 | Bentolila et al. |
| 2005/0130109 A1 | 6/2005 | Kirshenbaum |
| 2008/0126176 A1 | 5/2008 | Iguchi |
| 2010/0114654 A1 | 5/2010 | Lukose |
| 2010/0145902 A1* | 6/2010 | Boyan et al. .................... 706/54 |

OTHER PUBLICATIONS

Google Trends, "About Google Trends," available at http://www.google.com/intl/en/trends/about.html (last accessed on May 27, 2010).
IBM Webfountain, "Fountain of truth?", available at http://www.economist.com/science/tq/displayStory.cfm?story_id=2019861 (last accessed on May 27, 2010).
Quint, Barbara, "IBM's WebFountain Launched—The Next Big Thing?", available at http://newsbreaks.infotoday.com/nbreader.asp?ArticlesID=16617 (last accessed on May 27, 2010).
Seung, H.S., et al., "Query by Committee," COLT '92: Proceeding of the Fifth Annual Workshop on Computational Learning Theory, New York, New York, 1992, pp. 287-294.
Lewis, David D., et al., "Heterogeneous Uncertainty Sampling for Supervised Learning," Proceedings of the Eleventh International Conference on Machine Learning, Morgan Kaufmann Publishers, San Francisco, California, 1994, pp. 148-156.

(Continued)

*Primary Examiner* — Alan Chen

(57) ABSTRACT

An exemplary embodiment of the present invention provides a computer implemented method of developing a classifier. The method includes receiving input for a case, the case comprising a plurality of instances and an example, the example comprising a plurality of data fields each corresponding to one of the plurality of instances, wherein the input indicates which, if any, of the instances includes a data field belonging to a target class. The method also includes training the classifier based, at least in part, on the input from the trainer.

20 Claims, 5 Drawing Sheets

OTHER PUBLICATIONS

Tong, Simon, et al., "Support Vector Machine Active Learning with Applications to Text Classification," Journal of Machine Learning Research, 2001, pp. 45-46.

Zhang, Cha, et al., "An Active Learning Framework for Content Based Information Retrieval," IEEE Transactions on Multimedia, Special Issue on Multimedia Database, vol. 4, Issue 2, Jun. 2002, pp. 260-268, available at http://research.microsoft.com/en-us/um/people/chazhang/publications/tr01_04_chazhang.pdf (last accessed on Jun. 3, 2010).

Melville, Prem, et al., "Diverse Ensembles for Active Learning," Proceedings of the 21st International Conference on Machine Learning, Banff, Alberta, Canada, Jul. 2004, pp. 584-591.

Yan, Rong, et al., "Automatically Labeling Video Data Using Multi-class Active Learning," Proceedings of the Ninth IEEE International Conference on Computer Vision, Washington, D.C., vol. 2, 2003, pp. 1-8.

Hakkani-Tur, Dilek, et al. "An Active Approach to Spoken Language Processing," ACM Transactions on Speech and Language Processing, vol. 3, No. 3, Oct. 2006, pp. 1-31.

Ertekin, Seyda, et al., "Active Learning for Class Imbalance Problem," Proceedings of the 30th Annual International ACM SIGIR Conference on Research and Development in Information Retrieval, Amsterdam, The Netherlands, 2007, pp. 823-824.

Collins, Brendan, et al., "Towards Scalable Dataset Construction: An Active Learning Approach," Proceedings of the 10th European Conference on Computer Vision, Part I, Marseille, France, Published in 2008 by Springer-Verlag, Berlin, Heidelberg, pp. 86-98.

Forman, George, "BNS Feature Scaling: An Improved Representation over TF-IDF for SVM Text Classification," Proceedings of the 17th ACM Conference on Information and Knowledge Management in Napa Valley, California, Published by ACM, New York, New York, 2008, pp. 263-270.

Settles, Burr, et al., "Multiple-Instance Active Learning," Advances in Neural Information Processing Systems (NIPS), MIT Press, 2008, pp. 1289-1296.

Vijayanarasimhan, Sudheendra, et al., "What's It Going to Cost You?: Predicting Effort vs. Informativeness for Multi-Label Image Annotations," IEEE Computer Society Conference on Computer Vision and Pattern Recognition (CVPR), Miami Beach, Florida, Jun. 2009, available at http://userweb.cs.utexas.edu/~svnaras/papers/vijayanarasimhan_grauman_cvpr2009.pdf. (last accessed on Jun. 3, 2010).

Forman, George, et al., "Feature Shaping for Linear SVM Classifiers," Published and presented at the 15th ACM SIGKDD Conference on Knowledge Discovery and Data Mining, Paris, France, Jun. 28-Jul. 1, 2009, pp. 299-307.

Fenstermacher et al.; "Mining Client-Side Activity for Personalization" Department of Management Information Systems, Eller College of Business and Public Administration, University of Arizona, Jun. 2002.

Baoyao, Zhou; "Intelligent Web Usage Mining" Nanyang Technological University, Division of Information Systems, School of Computer Engineering, 2004.

Baynote Inc.: "The Collective Intelligence Platform," Online, http://www.baynote.com/technology/platform/ 2010.

Hottolink Inc.; "Recognize" Online, http://www.hottolink.co.jp/english/reconize.html, 2009.

Andrejko et al.: "User Characteristics Acquisition from Logs with Semantics" 8. Slovak University of Technology in Bratislava.

Hongjun Lu et al: "Extending a Web Browser with Client-Side Mining", Hong Kong University of Science and Technology Department of Computer Science, Clear Water Bay, Kowloon, Hong Kong, China, 2003.

Shankar et al.; "Personalized Web Search Based on Client Side Ontology", CS 498: B.Tech Project, 10. IIT Kanpur, India 2010.

Sendhikumar et al.; "Personalized ontology for web search personalization" 1. Anna University, Chennai, India , 2008.

Shahabi et al.; "Yoda an Accurate and Scalable Web based Recommendation System?" University of Southern California, Los Angeles, Sep. 2001.

Why Wubat? Website User Behavior & Analysis Tool, Wubat, Online, http://www.wubat.com/.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; "A Framework for Efficient and Anonymous Web Usage Mining Based on Client-Side Tracking", 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

* cited by examiner

METHOD AND SYSTEM FOR DEVELOPING A CLASSIFICATION TOOL

BACKGROUND

Marketing on the World Wide Web (the Web) is a significant business. Users often purchase products through a company's Website. Further, advertising revenue can be generated in the form of payments to the host or owner of a Website when users click on advertisements that appear on the Website. The online activity of millions of Website users generates an enormous database of potentially useful information regarding the desires of customers and trends in Internet usage. Understanding the desires and trends of online users may allow a business to better position itself within the online marketplace.

However, processing such a large pool of data to extract the useful information presents many challenges. For example, the different online entities that generate electronic documents may use different techniques or codes to represent similar information. Techniques for identifying the significance of certain information may not be readily available.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Exemplary embodiments of the present invention provide techniques for identifying semantically-similar portions of structured data lacking a common ontology. As used herein, the term "exemplary" merely denotes an example that may be useful for clarification of the present invention. The examples are not intended to limit the scope, as other techniques may be used while remaining within the scope of the present claims.

In exemplary embodiments of the present invention, a collection of raw electronic data is obtained for a plurality of online entities and users. The raw data may be used by a training system to develop a classifier for identifying a target class within the data. Selected portions of the raw data may be presented by the training system to a trainer that provides input to the training system regarding whether an identified data field contains data of the target class. The input from the trainer may be used by the training system to develop the classifier. When a sufficient amount of the raw data has been labeled by the trainer as belonging to the target class, the training system may automatically apply the classifier to the remaining data to identify additional target classes within the remaining data. As used herein, the term "automatically" is used to denote an automated process performed by a machine, for example, the computing device 102. It will be appreciated that various processing steps may be performed automatically even if not specifically referred to herein as such.

Furthermore, the raw data may be divided into portions, referred to herein as "cases," that share some common characteristic, such as a common data structure or a common source, for example. The training system may present an entire case of data to the trainer for evaluation rather than just one example of the data field. Thus, different examples of the same data field may be available to the trainer in the context of an entire case, which may enable the trainer to more readily identify patterns that reveal the usage of the data field and lead to a more accurate labeling of the data field. Furthermore, several data fields may be labeled simultaneously, rather than one at a time. Faster and more accurate techniques for labeling the data field may increase the accuracy of the classifier and reduce the amount of time and labor used to develop the classifier.

Figure 1:
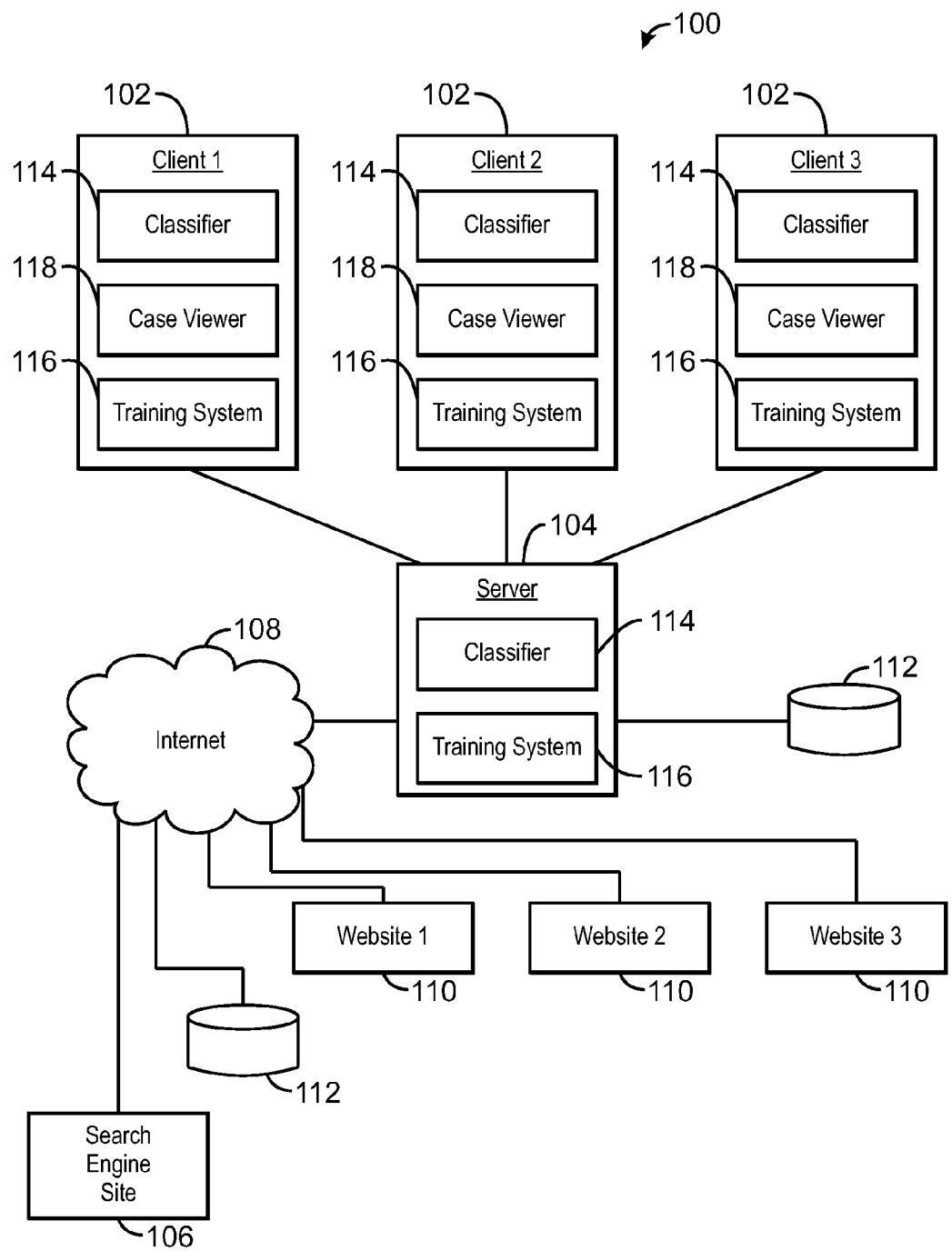
FIG. 1 is a block diagram of a computer network that may be used to develop a classification tool, in accordance with exemplary embodiments of the present invention.

FIG. 1 is a block diagram of a computer system 100 that may be used to develop a classifier, in accordance with exemplary embodiments of the present invention. As illustrated in FIG. 1, the computer system 100 may include one or more client systems 102 communicatively coupled to a server 104. The client systems 102 will generally have a processor which may be connected through a bus to a display and one or more input devices such as a keyboard a mouse or touch screen. The client systems 102 may also include tangible, machine-readable storage media, such as a storage system for the long-term storage of operating programs and data, including the programs and data used in exemplary embodiments of the present techniques. Further, the client systems 102 can have one or more other types of tangible, machine-readable media, such as a random access memory (RAM) for the temporary storage of instructions and data created during the operation of various programs.

The client systems 102 may be communicatively coupled to the server 104 through a local area network (LAN), a wide-area network (WAN), or another network configuration. The server 104 may have a machine-readable media, such as storage array, for storing enterprise data, buffering communications, and storing operating programs of the server 104. Through the server 104, the client systems 102 can access a search engine site 106 connected to the Internet 108. In exemplary embodiments of the present invention, the search engine 106 includes generic search engines, such as GOOGLE™, YAHOO®, BING™, and the like. The client systems 102 can also access Websites 110 through the Internet 108. The Websites 110 can have single Web pages, or can have multiple subpages. Although the Websites 110 are actually virtual constructs that are hosted by Web servers, they are described herein as individual (physical) entities, as multiple Websites 110 may be hosted by a single Web server and each Website 110 may collect or provide information about particular user IDs. Further, each Website 110 will generally have a separate identification, such as a uniform resource locator (URL), and will function as an individual entity.

The Websites 110 can also provide search functions, for example, searching subpages to locate products or publications provided by the Website 110. For example, the Websites 110 may include sites such as EBAY®, AMAZON.COM®, WIKIPEDIA™, CRAIGSLIST™, CNN.COM™, and the like. Further, the search engine site 106 and one or more of the Websites 110 may be configured to monitor the online activity of a visitor to the Website 110, for example, regarding searches performed by the visitor.

The client systems 102 and server 104 may also be able to access a database 112, which may be connected to the server 104 through the local network or to an Internet service provider (ISP) on the Internet 108, for example. The database 112 may be used to store a collection of electronic data to be processed in accordance with exemplary embodiments of the present inventions. As used herein, a "database" is an integrated collection of logically related data that consolidates information previously stored in separate locations into a common pool of records that provide data for an application.

The system 100 may also include a classifier 114 that may be used to identify a target class of information within the collection of electronic data, in accordance with exemplary embodiments of the present invention. Furthermore, one or more of the clients 102 may also be used in the development of the classifier 114. Accordingly, one or more of the clients 102 may include a training system 116. In some embodiments, the training system 116 obtains a collection of raw electronic data from the database 112, for example. The training system may group the raw data into portions referred to herein as "cases," which are discussed further below. In other exemplary embodiments, the grouping of the raw data into cases is performed by a separate system and provided to the training system. The training system 116 may present cases to one or more trainers and each trainer may provide training information to the training system 116 in the form of labels that are applied to each of the data fields in the presented case. As used herein, a "positive" label indicates that the instance does belong to the target class, and a "negative" label indicates that the instance does not belong to the target class. The training data may be used to develop the classifier 114, which may be applied to the remainder of the raw data.

Each of the client systems 102 may also include a case viewer 118 that receives the cases from the training system 116 and prompts the trainer to label the data fields of the case. The case viewer 118 may generate a graphical user interface (GUI) that enables the trainer to view the data received from the training system 116 and label the data fields that the trainer has identified as belonging to a target class.

In exemplary embodiments of the present invention, the training system and the case viewer 118 are included on a single client system 102. The cases generated from the raw electronic data may be provided to the client system 102 via a storage medium, for example, the database 112, a portable storage medium such as a compact disk (CD), and the like. The client system 102 may generate the classifier 114 using training data generated by the trainer via the client system 102. In other exemplary embodiments, the training system 116 is included on the server 104 and the case viewer 118 may be included on one or more of the client systems 102 so that more than one trainer may provide training data to the training system in a networked fashion. In such embodiments, the server 104 may operate the training system 116 by sending cases to the case viewers 118, receiving training data from the case viewers 118, and developing the classifier 114 based on the training data. Furthermore, it will be appreciated that the above system description represents only a few of the possible arrangements of a system for developing a classifier in accordance with embodiments of the present invention.

Figure 2:
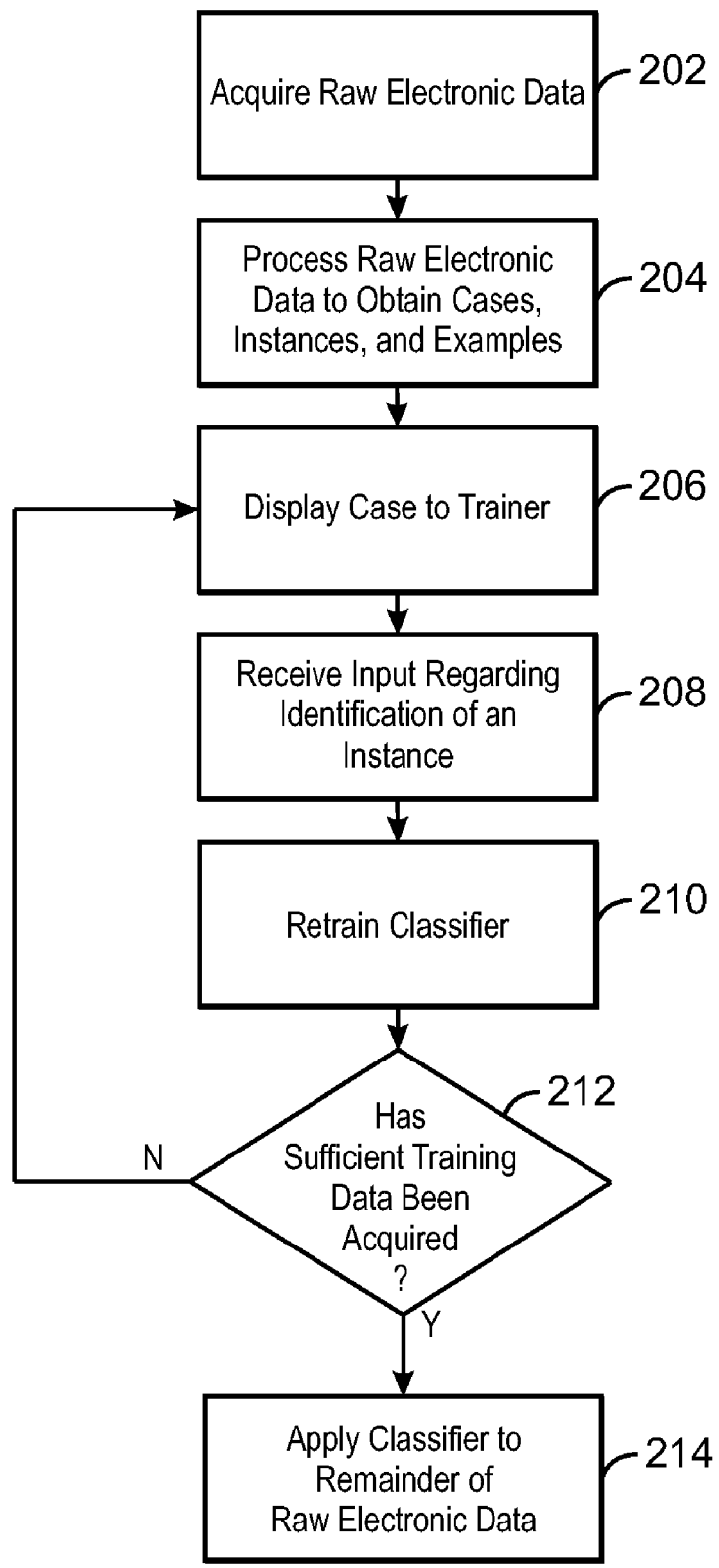
FIG. 2 is a process flow diagram of a method for identifying a target class of information within a collection of electronic data, in accordance with exemplary embodiments of the present invention.

FIG. 2 is a process flow diagram of a method for identifying a target class of information within a collection of electronic data, in accordance with exemplary embodiments of the present invention. The method is generally referred to by the reference number 200 and begins at block 202, wherein a collection of raw electronic data may be obtained. The raw electronic data may include any suitable electronic data and the target class of information may be any type of useful information that may be included in the raw electronic data. In some exemplary embodiments, the raw data includes Web activity data for a plurality of Internet user IDs generated at a plurality of Websites. For example, the raw electronic data may include records of the Web pages clicked on by individual browsers, the Hyper Text Markup Language (HTML) content of Web pages, the results of Web searches that have been performed at various Websites, and the like. In other embodiments, the raw electronic data includes any suitable electronic documents, for example, scanned documents, Adobe® Portable Document Format (PDF) files, Microsoft® Office documents, eXtensible Markup Language (XML) files, database tables, Semantic Web ontologies, picture files, audio files, or the like.

In exemplary embodiments of the present invention, the raw electronic data includes URL data obtained by directly monitoring Web activity on the Internet generated at a plurality of Websites by plurality of Internet browsers. For example, with reference to FIG. 1, the server 104 may monitor the online activity of the client systems 102. In other exemplary embodiments, the URL data is obtained from a third party, such as one or more Websites 110, an internet service provider, internet monitoring service, search engine site 106, and the like. Furthermore, in some embodiments the URL data may be obtained from the website logs of multiple organizations' Websites. In some embodiments, URL data may be obtained by gathering click-stream logs from multiple users via monitoring software installed on their client computers (either in the OS or in the browser or separate opt-in service). In some embodiments, URL data may be obtained by collecting the click-stream logs observed by one or more ISPs or Internet backbone providers that monitor Web traffic from many users to many Websites.

At block 204, the raw data may be processed to obtain cases, instances, and examples. The term "example" is used to refer to a grouping of data field values that have a common source, for example, the same query URL, the same record of a database table, and the like. The term "case" is used to refer to a collection of examples whose data fields co-occur in a way that enables the data fields to be grouped together across several examples into instances, which may be processed as a group by the training system. In various embodiments, a case may include query URLs directed at the same Website or same on-line store, records in the same database table, and the like. Each case may include one or more instances and one or more examples. Each instance may include a plurality of instance values each of which corresponds with a data field value from a single example. In some embodiments, an instance includes a plurality of instance values corresponding to a single example.

In some exemplary embodiments of the present invention, the raw electronic data includes a plurality of electronic documents, and the target class includes those instances corresponding to data fields within the documents that represent an author, a title, a manufacturer, a model, a company, a stock identifier, a mutual fund identifier, a price, an item identifier, a category identifier, an article reference, an advertisement, a non-boilerplate text section, a portrait photograph, and the like. In other exemplary embodiments, the collection of raw data is information in a database, and the target class may be product name columns. In this example, each database table may be a case, each column in the database tables may be an instance, and each row may be an example. In another exemplary embodiment, the collection of raw data includes Web pages, and the target class may be content text as opposed to boilerplate or advertisements. In this example, the collection of Web pages for an entire Website 110 may be a case, the HTML elements, HTML CLASS attribute values, or XPath expressions identifying portions of pages may be instances, and particular Web pages may be examples. In another exemplary embodiment, the raw data may include images, and the target class may be female faces in the image. In this example, individual photographs may be cases, identified faces may be instances, and each case may have only one example.

For purposes of clarity, the exemplary embodiments of the present invention described in further detail herein may refer to raw data that includes query URLs that have been generated by a plurality of users at a plurality of Websites, and the target class is a data field that includes search terms entered by a user.

A query URL will generally be of the form:
http://www.website.com/a/b/c?k1=v1&k2=v21+v22&k3=v3

In this query URL, the hostname is generally the portion of the URL that precedes the first single forward slash, in this case "http://www.website.com", the pathname is everything from the first single forward slash (when one exists) that precedes the question mark, in this case "/a/b/c", and the query portion of the query URL is everything that follows the question mark. As used herein, the term "Website name" is used to refer to any combination of components from the hostname and components from the pathname. Furthermore, the query portion of the query URL may include one or more data fields, which may be separated by ampersands. Each data field may include a data field name, e.g., "k1," and a data field value, e.g., "v1." In the example query URL provided above, the query URL includes three data fields, namely "k1," which has the value "v1," "k2," which has the value "v21+v22," and "k3," which has the value "v3."

It will be appreciated that the naming convention used herein is hypothetical and that any suitable character string may be used to represent the various data field names and values used in an actual query URL. The naming convention used in the query URL may be an ad hoc convention designated for a single Web form or Website. Therefore, a common naming convention used across the multiple Websites may not be available. For example, a hypothetical query field named "q" may refer to different types of data. In one query URL, "q" may refer to data field that holds a search term entered by a user. However, in another query URL, "q" may refer to something different, for example a data field that holds a desired quantity of a product. Moreover, a tool for translating among the various naming conventions may not be available. According to exemplary embodiments of the present invention, the training system develops a classifier 114 that is able to accurately identify certain data fields in a specific query URL as belonging to a specified class, despite the fact that the specified class is not represented in a consistent manner across multiple query URLs.

In exemplary embodiments wherein the raw data comprises query URLs, each query URL may be considered an example, and the examples may be grouped together into cases. Each case may include a collection of query URLs that correspond in some way. Furthermore, each case may include one or more instances that correspond with the data fields included in each of the query URLs in the case. Each instance may have an instance name that corresponds with the text string that represents the data field name in the query URLs. Each instance may also have a plurality of instance values, one for each occurrence of the named data fields in the examples, corresponding to the data field values included in the query URLs. The instance names and values may be extracted from the query URLs by textual parsing of the query URL. Embodiments of the present invention may be better understood with reference to the discussion of FIG. 3 below, which describes a sample case generated from query URLs and displayed in a GUI of the case viewer 118.

In one exemplary embodiment of the present invention, the cases are generated according to the similarity of the query URLs, with query URLs grouped together in a case when they are determined to be similar to one another by a similarity rule or rules. For example, all query URLs that have a common hostname may be determined to be similar and grouped together in the same case. In other embodiments, the query URLs are determined to be similar to one another according to some portion of the query URLs' hostname and/or path. For example, with reference to the sample query URL provided above, the query URLs that start with "http://www-.website.com/a" may be determined to be similar. In other exemplary embodiments, URLs are determined to be similar when they have a common suffix of the hostname, where the suffix is based on the sequence of elements separated by dots. For example, URLs with the hostnames that end in "hp.com", (for example, URLs whose host names are "shopping.hp-.com" and "support.hp.com") may be determined to be similar. In other exemplary embodiments, the URLs that are determined to be similar are those that, in addition to having a common hostname or hostname suffix, have a common prefix of the path. For example, URLs with paths that begin "/catalog/" (for example, "/catalog/dept1" or "/catalog/dept2/query") may be determined to be similar, while URLs with the same hostnames but that do not begin with "/catalog" may be grouped together in a different case.

In some embodiments, multiple similarity rules may be applied based on the query URLs. For example, one case may include those query URLs that match a particular hostname prefix and path suffix while another case may include those query URLs that match a (different) particular hostname prefix. In some such embodiments, the hostnames and/or paths may be normalized (e.g., lowercased) and a component of the hostname may be transformed before the similarity rules are applied. For example, a hostname component of "www-12" may be converted into "www" or "12.www". In yet other embodiments, query URLs from several different Websites are determined to be similar according to some similarity between the instances generated from the query URLs. For example, query URLs with one or more matching data field names may be grouped into the same case regardless of the hostname or path of the query URLs. Matching data fields names may be data field names that are identical after applying a normalization routine, for example, setting all characters lowercase. Exemplary techniques for generating cases from query URLs are discussed further in the commonly assigned and co-pending U.S. patent application Ser. No. 12/618,170, filed on Nov. 13, 2009, entitled "Method and System for Segmenting Query URLs," by Shyam Sundar Rajaram, et al., which is hereby incorporated by reference as though fully set forth in its entirety herein.

In some exemplary embodiments, the processing of the raw URL data discussed in relation to block 204 is executed by the training system 116. In other embodiments, the processes discussed in relation to block 204 is executed separately, and the case data generated from the raw query URL data may be stored in a database that is accessible to the training system 116.

At block 206, one or more of the cases may be presented to a trainer in order to obtain training information that may be used to generate the classifier 114. The training system 116 of FIG. 1 may be operating on the server 104, and the training system 116 may send the case to one or more of the client systems 102. Each of the client systems 102 may present the case to the trainer via the case viewer 118. In exemplary embodiments, the trainer is a person, and the client system 102 may display the case to the trainer via a display coupled to the client system 102. An exemplary GUI that may be displayed to the trainer is discussed in relation to FIG. 3. The trainer may also be an animal, a neural network, a program, or any other decision-making tool that can make a binary classification decision or any tool or entity based upon whose behavior a binary classification decision can be made.

At block 208, the training system 116 may receive input regarding identification of an instance from a trainer. In providing this input, the trainer may label one or more of the case's instances as belonging to one or more target classes. By way of example, the trainer may click on a table column or checkbox 312 (FIG. 3) corresponding to the instance. In some exemplary embodiments, the trainer provides a confidence value that reflects the trainer's level of confidence that the instance is of the target class. For example, the trainer may score an instance on a scale of 1 to 5, 1 indicating a high level of confidence that the instance is not of the target class, and 5 indicating a high level of confidence that the instance is of the target class. The confidence value may be taken into account in generating the classifier 114. In other exemplary embodiments, the trainer simply provides a positive or negative indicator for each instance, indicating the trainer's best judgment about whether the instance is of the target class. In some exemplary embodiments, the trainer provides only positive indications and the training system 116 may infer negative labels for all instances in the case not indicated as positive when the trainer indicates completion of labeling the case.

Furthermore, the raw data may be labeled by more than one trainer located at more than one client system 102. For example, the training system 116 may send a different case to each of the client systems 102 and receive training information for each case from different trainers. In this way, a greater amount of training information may be obtained in less time. In other exemplary embodiments, the training system 116 sends the same case to two or more client systems 102. In this way, training information for a single case may be obtained from more than one trainer, which may enable various techniques for validating or weighting the training data. One validation technique may involve receiving labels for a single case from three or more trainers and determining a majority opinion regarding each instance of the case. The majority opinion regarding each instance may be assigned as the label for the instance, which is used in the generation of the classifier 114. In another exemplary embodiment, the labels provided by the trainers for a particular instance are averaged to obtain a cumulative weight value that reflects the average confidence level of the trainers regarding whether the instance is of the target class. Furthermore, the trainers themselves may be rated according to the trainer's ability to correctly label the instances based on the input from other trainers. Rating the trainers may enable the training system 116 to identify trainers that may be unreliable and to thereby give less consideration to the labels provided by such trainers.

At block 210, the classifier 114 may be retrained based on the training information received from the trainer. In exemplary embodiments of the present invention, the classifier 114 is retrained using a supervised machine-learning algorithm, for example, a Naïve Bayes algorithm, support vector machine, or the like. After retraining the classifier 114, the classifier 114 may be used to compute a score for each instance of each case, the score corresponding with a likelihood that the instance is of the target class. Furthermore, a threshold value may be specified, which the training system compares against the score to determine whether it considers the instance to be of the target class. For example, the scores may be normalized to a range of between zero and one, zero indicating a low probability and one indicating a high probability. Furthermore, the threshold may be specified as 0.5, so that instances with a score greater than 0.5 may be considered to be of the target class, while instances with a score less than 0.5 may be considered to not be of the target class. It will be appreciated that the score range and threshold value considered above is only one possible embodiment, and that other ranges and threshold values may be used, depending on system design considerations. Furthermore, the threshold value may be other than in the middle of the score range. For example, a higher threshold value may be specified in order to identify instances that have a higher degree of probability of belonging to the target class. In some embodiments, the threshold used may change over time. In such embodiments, the threshold used may depend on the result of computing classification scores for labeled cases. In some embodiments, lower classification scores are used to indicate greater likelihood of belonging to the target class compared to higher scores.

In some exemplary embodiments of the present invention, the classifier 114 is retrained each time new training information is received from the case viewer 118, for example, after the trainer makes a selection regarding the labeling of an instance or after the instance labels for an entire case have been accepted or confirmed. In other embodiments, the classifier 114 is retained when training information has been received for several cases, for example, when a specified number of cases have been labeled by the trainer or after the end of an entire training session, for example, after the trainer closes the case viewer 118 or the training system 116. In some embodiments, retraining the classifier 114 is delayed until a determination is made that the trainer has stopped, perhaps temporarily, actively providing instance labels, as when a specified amount of time has elapsed during which no new instance labels have been provided.

In exemplary embodiments of the present invention, the scores are computed by generating features for each instance and comparing the features of the labeled instances with the features of the unlabeled instances. The scores computed for each of the unlabeled instances will correspond to the similarity between the unlabeled instance features and the labeled instance features. An unlabeled instance that has features that are similar to the labeled instances of the target class may receive a high score corresponding with a high level of likelihood that the unlabeled instance is of the target class.

Furthermore, the instance features may be "instance-centric," "case centric," or some combination thereof. As used herein, an "instance-centric" instance feature is a statistical feature relating to some aspect of an instance's values, for example, the number of letter characters in the instance, the percentage of letter characters relative to numerical characters in the instance, and the like. One example of an instance-centric feature may include the percentage of instance values that are unique for a particular instance, e.g., occur only once within the instance. Another example of an instance-centric feature may include the percentage of examples that are unique, e.g., the combination of instance values within the example occurs only once within a case. Another example of an instance-centric feature may include the percentage of examples that are missing or empty for a particular instance.

Further examples of instance-centric features may include, but are not limited to the minimum, maximum, median, mean, and standard deviation of individual string features over the data field values within an instance. The individual string features may include values such as the string length, the number of letters in the string, the number of words in the string, the number of whitespace characters in the string, and whether the string is all whitespace. Additional string features may include the number of characters in the string that are capitalized, the number of lowercase characters in the string, the number of numerical values in the string, and the average word length of the string. Further string features may include the number of control characters in the string, the number of hexadecimal digits or non-hexadecimal letters in the string, the number of non-ASCII characters in the string, the number of individual punctuation characters ("@", ".", "$", "_", etc.) in the string, and the like. In some embodiments, "instance-centric" features further relate to metadata associated with the corresponding fields rather than the instance values. For example, "instance-centric" features may be based on a tag, keyword, or name of the field, alone or in the context of similar metadata for other instances in the case.

In other exemplary embodiments, an instance-centric feature may include the data field name corresponding to a particular instance or some property of the data field name, such as the length or initial character. For example, if the target class is a data field corresponding to an author of an article, the data field name "AU" may provide some evidence that the corresponding data field value identifies an author. Thus, the data field name corresponding to an instance may be used, in addition to other features, to determine whether the instance belongs to the target class. The data field name may be represented in the feature vector as a text string corresponding to the data field name or a hash of the text string.

As stated above, the instance features may also be case-centric. As used herein, a "case-centric" instance feature is a statistical feature of the instance that takes into account some aspect of the case in which the instance is grouped. For example, a case-centric instance feature may be based on multiple instances in the same case. Case-centric instance features are discussed further in the commonly assigned and co-pending U.S. patent application Ser. No. 12/618,181, filed on Nov. 13, 2009, entitled "Method and System for Developing a Classification Tool," by Evan R. Kirshenbaum, et al., which is hereby incorporated by reference as though fully set forth in its entirety herein.

In some exemplary embodiments, the case-centric instance features are based on a comparison of the instance-centric features computed for the case, as described above. For example, if the instance-centric feature is based on the number of distinct values in the instance, each instance of the case may be ranked according the value of the instance-centric feature, and the case-centric instance feature may be based on the computed rank. Thus, for example, the instance in the case with the most distinct values may have a case-centric instance feature value of 1, the instance in the case with the next largest number of distinct values may have a case-centric instance feature value of 2, and so on. In another embodiment, the total number of distinct values across all of the instances are computed and used as a normalization value. Thus, the case-centric instance feature may be computed by dividing the instance-centric feature by the normalization value, resulting in case-centric instance feature values in the range of zero to one for each of the instances.

As discussed further below in reference to FIG. 3, the scores computed for each instance by the current classifier 114 may be used determine how the case is presented to the trainer by the case viewer 118. Furthermore, as discussed below in reference to block 212, the scores computed for each unlabeled instance may also be used to determine which case to provide to the trainer next.

At block 212 a determination may be made regarding whether the training system 116 has received sufficient training data. In some exemplary embodiments, the training system 116 are programmed to obtain training data for a specified number of cases or a specified group of cases. Accordingly, the training system 116 may determine that sufficient training data has been acquired when the specified number or group of cases have been processed.

In some exemplary embodiments, the training system 116 executes an evaluation routine that evaluates the accuracy of the classifier 114. The training system 116 may apply the classifier 114 to a group of cases whose instance labels are known, for example, cases that have already been labeled by the trainer. As discussed in relation to block 210, scores may be computed for each labeled instance by generating instance-centric and/or case-centric features for each instance. The classifier 114 developed by the training system 116 up to this point may be used by the training system 116 to determine whether each instance is of the target class based the scores generated for each instance. The results generated by the current classifier 114 may be compared to the known instance labels to determine the accuracy of the classifier 114. In some embodiments, a set of labeled instances or the instances associated with a set of labeled cases are withheld from use in training the classifier 114 and only used for evaluating its performance. In other embodiments, the labeled cases are divided into several sets or "folds" and cross-validation techniques used to evaluated the performance of the classifier when predicting the labels associated with each fold based on classifiers trained using labeled instances associated with the other folds.

If sufficient training data has been received by the training system 116, the process flow of method 200 may return to block 206, wherein another case is presented to the trainer for labeling. The next case to present to the trainer may be determined randomly or determined based on some property of the cases. For example, the remaining unlabeled cases may be ranked according to the number of examples or the number of instances included in each case, and the case with the greatest number of examples or instances may be presented to the trainer next. In this way, the cases that are likely to provide a greater amount of training data may be presented earlier, thus reducing the amount of time used to develop In exemplary embodiments of the present invention, the scores generated for the unlabeled cases at block 210 are used to determine the next case to present to the trainer. The scores may be used to generate an uncertainty value corresponding to a degree of certainty regarding whether the instance is of the target class. For example, a high score for an instance may indicate a high level of probability that the instance is of the target class, while a low score may correspond with a high level of probability that the instance is not of the target class. For both high scores and low scores, the uncertainty value computed for the instance may be low. However, for an instance that has a score close to the threshold value, either just above or just below, the uncertainty value computed for the instance may be high. In an exemplary embodiment, the uncertainty value is calculated according to the following equation:

$$unc(I) = \begin{vmatrix} \dfrac{\text{score }(I)}{\theta} & \text{If score }(I) \le \theta \\ \dfrac{1 - \text{score }(I)}{1-\theta} & \text{If score }(I) > \theta \end{vmatrix}$$

Wherein unc(I) is the uncertainty value for the instance, I, score(I) is the score computed for the instance, I, and (I) is the threshold value.

The unlabeled cases may be ranked based, at least in part, on the uncertainty values computed for each of the instances within each case. The ranks may be used, at least in part, to determine which case to display next. In one exemplary embodiment, the uncertainty values for each instance within a case are summed to provide a total uncertainty for the case, and the case with the highest total uncertainty may be displayed next. In this way, the training system 116 may present the case that is likely to evoke more useful training data.

In some embodiments, a case is re-presented to a trainer or presented to another trainer when it is determined that the score for one or more of its instances is sufficiently inconsistent with a label given to such an instance, for example, when the score given by the classifier 114 indicates that the instance is highly likely to be a member of the target class but a trainer gave it a label indicating that it was not of the target class. If the training system 116 determines that sufficient training data has been acquired, the process flow of method 200 may advance to block 214

At block 214, the training system 116 may apply the classifier 114 to the remaining unlabeled data as well as any additional data that may be acquired later. New classification scores may be generated by the training system 116 for each of the unlabeled instances. The new classification scores may be used to flag the unlabeled instances according to whether they belong to the target class, as discussed above in relation to block 210. For example, those instances with scores greater than the threshold may be flagged as being of the target class, while those instances with scores below the threshold may be flagged as not belonging to the target class. In this way, a large volume of structured data lacking a common ontology may be processed to extract some specified target information. In some exemplary embodiments, the classifier 114 is retrained periodically or when it is determined that the classifier 114 is not performing adequately.

The target information extracted from the raw data may be used in wide variety of applications. In some exemplary embodiments, the search terms extracted from the query URLs are used to generate a wide variety of metrics pertaining to the desires and interests of Internet users based on the Web activity generated by a plurality of users across a plurality of Websites. Techniques for using the search terms extracted from the query URLs to generate such metrics are discussed further in the commonly assigned and co-pending U.S. patent application Ser. No. 12/618,151, filed on Nov. 13, 2009, entitled "Method and System for Processing Web Activity Data," by George Forman, et al., which is hereby incorporated by reference as though fully set forth in its entirety herein.

Figure 3:
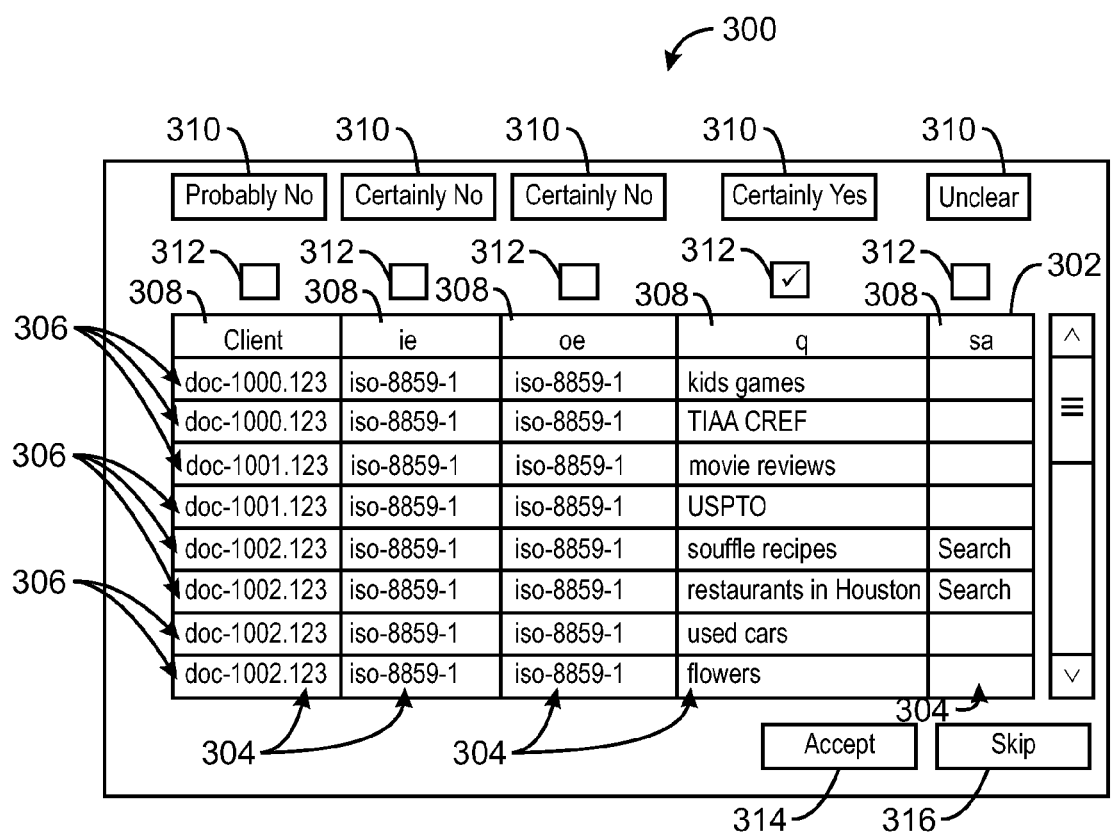
FIG. 3 is a graphical representation of an exemplary graphical user interface (GUI) that may be used to display a case for labeling by the trainer, in accordance with exemplary embodiments of the present invention.

FIG. 3 is a graphical representation of an exemplary GUI that may be used to display a case for labeling by the trainer, in accordance with exemplary embodiments of the present invention. The training GUI 300 may be displayed on a client system 102 for evaluation by the trainer and may include a table 302 that displays a case to the trainer. The table 302 may include one or more columns 304, each of which corresponds with an instance of the case. The table may also include one or more rows 306 each of which corresponds with an example of the case. The examples may correspond with query URLs that have a common Website path name, for example "http://www.MySearchEngine.com/search." The instances may correspond with the data fields included in the query portion of the query URLs. The sample example shown in the first row may have been generated from the hypothetical query URL "http://www.MySearchEngine.com/search?Client=doc-1000.123&ie=iso-8859-1&oe=iso8859-1&q=kids games." The data field names of the query URL may be provided in a header 308 above each instance, while the data field values populate each corresponding instance of the case.

In another exemplary embodiment, the rows do not correspond to individual examples. Rather, the displayed values in each column may represent the values associated with the corresponding instance, sorted according to some criterion. For example, the values may be sorted to show the most frequently observed values at the top of the column. In some embodiments, the rows in each column correspond to distinct values associated with the instance, and may include an indication of the number or percentage of examples in which the distinct value occurred. In some embodiments, there is a separate indication of the number or percentage of examples for which the fields associated with the instance did not exist or had no associated value. In some embodiments, instances that have fewer than a specified number or proportion of values are omitted from presentation, resulting in such instances not receiving labels from the trainer and not being considered either positive or negative training examples when the case is labeled.

The GUI may also include a confidence indicator 310 that provides an indication of the current score assigned by the classifier 114 to each instance. In some embodiments, the confidence indicator 310 displays a numerical score that corresponds with the instance score, for example, a percentage probability that the instance is of the target class. In other embodiments, the confidence indicator 310 displays a textual message corresponding to the instance score, such as, "probably no," "certainly no," "probably yes," "certainly yes," and "uncertain." In other embodiments, the certainty indicator 310 or the columns 308 are color coded to indicate the instance score. In some embodiments, a contrastive presentation such as a bold font for high scores and an italic font for low scores is used to indicate the instance score. The confidence indicator 310 may help the trainer decide whether a particular instance is of the target class. In some embodiments, the GUI provides an indication of labels given for an instance by other trainers or previously by this trainer.

In some exemplary embodiments, the ordering of the instances matches the order in which the data fields corresponding with the instance are more often positioned within the query URL. In other exemplary embodiments, the instances are ordered according to the score computed for each instance by the classifier 114. For example, the instances may be presented in order of increasing or decreasing score. In this way, the trainer may be provided with another indication of the classifier's current approximation regarding each of the instances, which may also help the trainer decide whether the instance is of the target class.

To identify a particular instance as belonging to the target class, the trainer may select the column 308 corresponding to the instance, e.g., by clicking it with a mouse or highlighting it with the keyboard and pressing a specified key. Each column 308 may correspond with a selection icon, such as a check box 312, in which case the trainer may identify instances by checking or unchecking the checkbox 312. Further, the scores generated for the instances during the training of the classifier 114 at block 210 may be used to preselect one or more of the instances. For example, those instances with scores that are above the specified threshold may be shown with the checkbox 312 initially checked. The user may override the pre-selection provided by the training system 116. In some exemplary embodiments, the threshold used to decide whether to present the checkbox 312 as initially checked is different from the threshold used to decide whether an instance is a member of the target class. For example, the threshold used to decide whether to present the checkbox 312 as initially checked may be more stringent. Furthermore, in many cases, only one of the instances is likely to be positive. Thus, when the trainer selects an instance as positive the remaining instances in the case may be automatically labeled negative. In this way, several instances may be labeled simultaneously in response to a single labeling action of the trainer, resulting in much faster instance labeling compared to labeling instances one-at-a-time.

As discussed above in relation to block 210 of FIG. 2, the labeling of an instance may trigger the retraining of the classifier 114. Accordingly, each time the trainer labels an instance, the GUI 300 may be updated to reflect the new instance scores. For example, the instances may be reordered or the confidence indicators 310 may be updated to reflect the new scores. In some embodiments, the confidence indicators 310 are updated but column ordering left unchanged to prevent trainer distraction.

When the trainer has identified each of the instances of the currently displayed class, the trainer may click a button, such as the "Accept" button 314. In other exemplary embodiments, the trainer indicates completion of labeling a case by selecting another case to label. The identifications provided by the trainer may be used by the training system 116 to label each of instances regarding whether the instance belongs to the target class. The labeling information provides training data to the training system 116 from which to generate the classifier 114. Alternatively, if the trainer is unsure about how to label one or more of the instances, the trainer may select the "Skip" button 316, in which case no new labeling data is provided to the training system 116 and the training system 116 selects a new case to provide to the trainer. Furthermore, the trainer may be provided the ability to re-select already labeled cases, either for review or to change labels.

The sample case shown in the GUI of FIG. 3 demonstrates another advantage of using the case-centered approach in training the classifier 114. For example, the trainer may not be familiar with the abbreviations "TIAA CREF" in row 3 or "USPTO" in row 5. As such, if the trainer had been presented with those examples singularly, without the benefit of the context provided by the case, the trainer may have mistaken those values as automatically generated code words rather than search terms entered by a user. However, when viewed in the context of the entire case, it may be clearer to the trainer that the data field values corresponding with instance "q" are search terms entered by a user. Thus, the data field values are more likely to be labeled correctly when presented as an entire case containing instances.

For purpose of clarity, certain exemplary embodiments have been described in terms of identifying user-entered search terms within query URLs generated by Web forms. However, it will be appreciated that the present techniques may be used in a number of exemplary embodiments to identify any suitable target class of information within any suitable collection of structured data. For example, exemplary embodiments of the present invention are directed to identifying columns in a database table that represent a particular semantic item, such as a comment, birth date, or product purchased. Other embodiments are directed to identifying columns in a PDF table that represent a particular semantic item, such as a part number or price. Further, a detail field, such as a price or product description may be identified within a business-specific or domain-specific semantic Web ontology or in XML data. Present techniques may also be used to identify text blocks in an HTML page that represent the page's content as opposed to advertising or boilerplate (or vice versa) or to identifying the clauses in a contract document that specify fees or usage restrictions. Other exemplary embodiments are directed to identifying the portions of the scanned front matter of a book that represent the title, author, or copyright date or identifying the references in a scientific article. Other embodiments are directed to identifying faces in a photograph that are a particular person, a woman, or just actually a face (of those determined to be potentially faces). Exemplary embodiments are also directed to other photo and video recognition techniques, such as identifying faces with red-eye or portions of a picture that are out of focus, identifying construction activity or troop movement from satellite photographs, or identifying suspicious activity on security cameras.

Figure 4:
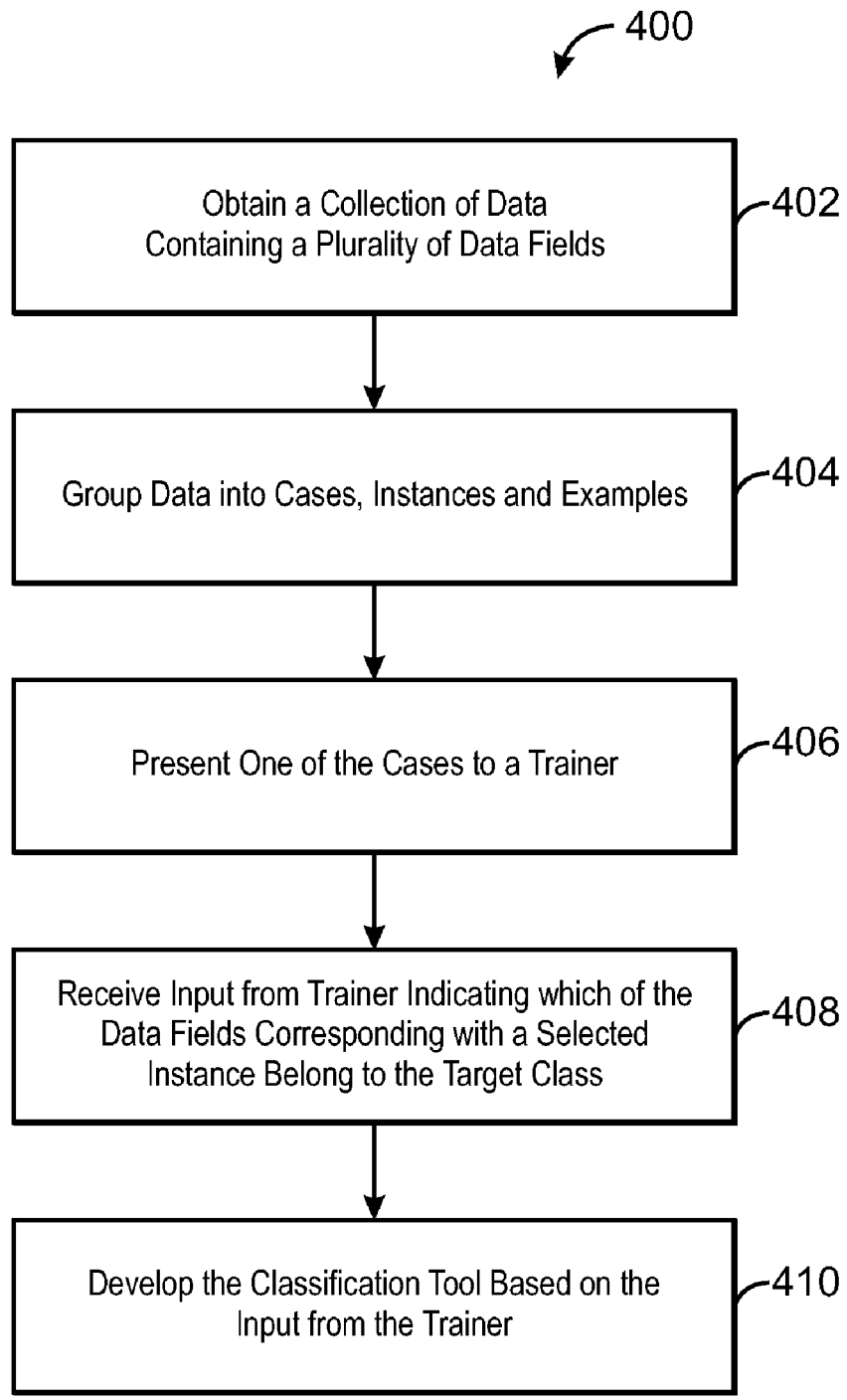
FIG. 4 is a process flow diagram of a method for identifying a target class of information within a collection of electronic data, in accordance with exemplary embodiments of the present invention.

FIG. 4 is a process flow diagram describing an overview of the method for identifying a target class of information within a collection of electronic data, in accordance with exemplary embodiments of the present invention. The method is generally referred to by the reference number 400 and begins at block 402, wherein a collection of electronic data containing a plurality of data fields is obtained. At block 404, the electronic data is grouped into cases, each case including a plurality of examples and each example including one or more data fields corresponding with one or more instances. One of the cases is presented to a trainer, as shown at block 406. At block 408, input is received from the trainer. The input may indicate which of the data fields corresponding with a selected instance are believed by the trainer to belong to the target class. At block 410, the classifier 114 is developed based by the training system, at least in part, on the input from the trainer.

Figure 5:
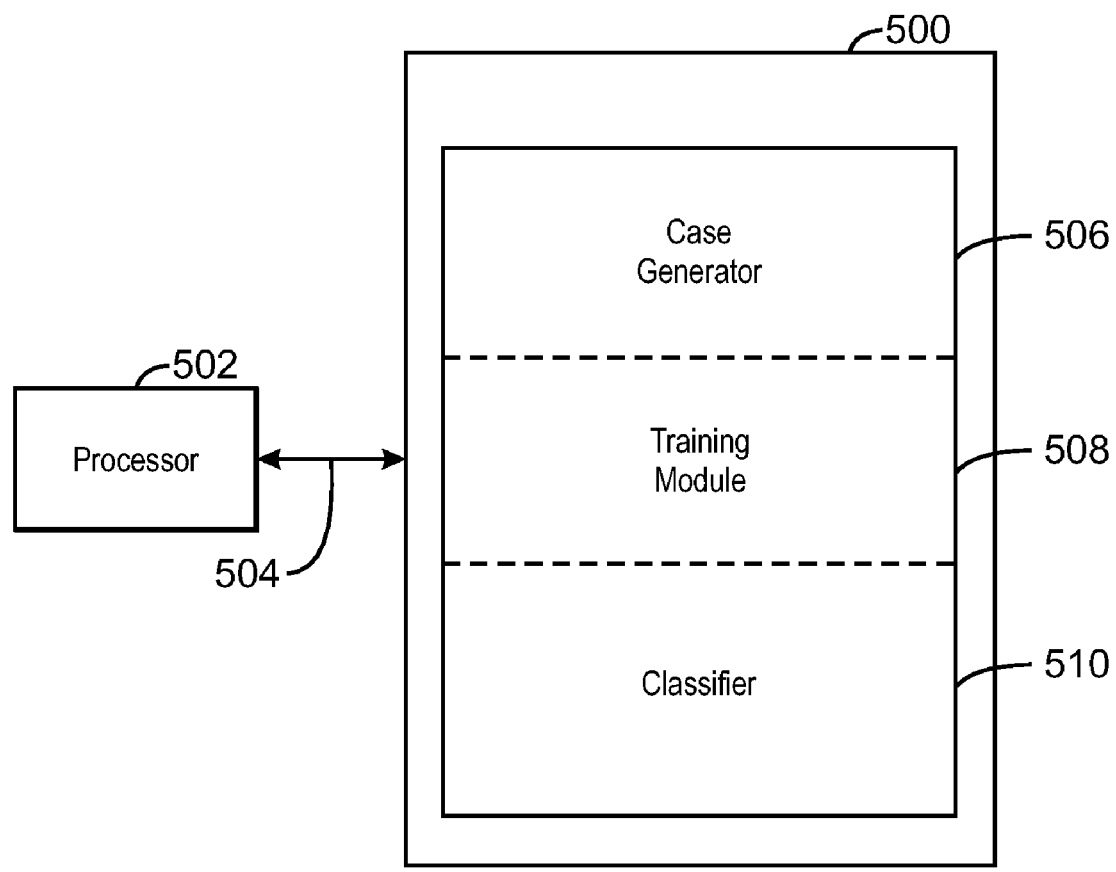
FIG. 5 is a block diagram showing a tangible, machine-readable medium that stores code configured to generate a classification tool, in accordance with exemplary embodiments of the present invention.

FIG. 5 is a block diagram showing a tangible, machine-readable medium that stores code configure to generate a classifier, in accordance with an exemplary embodiment of the present invention. The tangible, machine-readable medium is referred to by the reference number 500. The tangible, machine-readable medium 500 can comprise RAM, a hard disk drive, an array of hard disk drives, an optical drive, an array of optical drives, a non-volatile memory, a universal serial bus (USB) drive, a digital versatile disk (DVD), a compact disk (CD), and the like.

In some exemplary embodiments, the tangible, machine-readable medium 500 stores a collection of data comprising a query URLs generated by several users accessing Web forms from different Web sites. Further, the tangible, machine-readable medium 500 may be located in a client system 102 (FIG. 1), a server 104, or distributed across both the client system 102 and the server 104. In one exemplary embodiment of the present invention, the tangible, machine-readable medium 500 is accessed by a processor 502 over a communication path 504.

As shown in FIG. 5, the various exemplary components discussed herein can be stored on the tangible, machine-readable medium 500. For example, a first region 506 on the tangible, machine-readable medium 500 may store a case generator configured to group the query URLs into cases. Each case may include a plurality of examples corresponding with individual query URLs, each case may also include one or more instances corresponding with the data field values of the query URLs. A region 508 can include a case viewer configured to present some of the cases to a trainer and prompt the trainer to provide an instance label for each of the case's instances according to whether the instance belongs to a target class. A third region 510 can include a training system that receives the instance labels and generate a classifier based, at least in part, on the instance labels.

What is claimed is:

1. A computer-implemented method of developing a classifier, comprising:
   receiving input for a case, the case comprising a plurality of instances and an example, the example comprising a plurality of data fields each corresponding to one of the plurality of instances, wherein the input indicates which one, if any, of the plurality of instances includes a data field belonging to a target class; and
   training the classifier based, at least in part, on the input from the trainer.

2. The computer-implemented method of claim 1, comprising obtaining a collection of electronic data comprising the data fields, and grouping the electronic data into cases comprising one or more examples with corresponding instances.

3. The computer-implemented method of claim 1, wherein the case comprises a plurality of examples corresponding with query URLs generated by a plurality of users.

4. The computer-implemented method of claim 1, wherein the target class comprises those data fields that include search terms entered by a user.

5. The computer-implemented method of claim 2, wherein the electronic data comprises a plurality of query URLs and grouping the electronic data into cases comprises grouping together query URLs that are determined to be similar.

6. The computer-implemented method of claim 5, wherein the query URLs are determined to be similar based on a number of data field names in common.

7. The computer-implemented method of claim 1, comprising using the classifier to generate a score for an unlabeled instance based, at least in part, on an instance feature, the score corresponding to a likelihood that the unlabeled instance is of a target class.

8. The computer-implemented method of claim 7, wherein presenting the case to the trainer comprises generating a visual indication of the score computed for each instance.

9. The computer-implemented method of claim 1, wherein presenting the case to the trainer comprises selecting the case based, at least in part, on the number of examples included in the case.

10. The computer-implemented method of claim 1, wherein the electronic data comprises a plurality of electronic documents, a data field comprises an identifiable portion of a document, and the target class comprises a representation of at least one of an author, a title, a manufacturer, a model, a company, a stock identifier, a mutual fund identifier, a price, an item identifier, a category identifier, an article reference, an advertisement, a non-boilerplate text section, or a portrait photograph.

11. A computer system, comprising:
    a processor that is configured to execute machine-readable instructions;
    a storage device that is configured to store a case comprising a plurality of instances and an example, the example comprising a plurality of data fields each corresponding to one of the plurality of instances;
    a memory device that stores instructions that are executable by the processor, the instructions comprising:
    a training system configured to receive an instance label for each of the case's instances according to whether the corresponding instance belongs to a target class, and generate a classifier based, at least in part, on the instance label.

12. The computer system of claim 11, comprising a case generator configured to receive a collection of electronic data comprising the data fields and group the data fields into a plurality of cases, each case comprising a plurality of examples with corresponding instances.

13. The computer system of claim 11, comprising a plurality of case viewers running on a plurality of client systems, wherein the training system is configured to receive instance labels from the plurality of case viewers.

14. The computer system of claim 11, wherein the training system is configured to rank the case based on the number of examples included in the case and provide the case to the case viewer based on the rank.

15. The computer system of claim 11, wherein the training system is configured to generate a score for each of the instances based, at least in part, on an instance feature, the score corresponding with a degree of likelihood that that the instance is of the target class.

16. The computer system of claim 15, wherein the instance feature comprises at least one of a minimum, maximum, median, mean, or standard deviation of an individual string feature over the data field values within the instance.

17. The computer system of claim 15, wherein the training system is configured to compute an uncertainty value based, at least in part, on the score, and provide the case to the case viewer based, at least in part, on the uncertainty value.

18. A non-transitory computer-readable medium, comprising code configured to direct a processor to:
    receiving labels for a case, the case comprising a plurality of instances and an example, the example comprising a plurality of data fields each corresponding to one of the plurality of instances, wherein the labels indicate which, if any, of the instances includes a data field belonging to a target class; and
    generate a classifier based, at least in part, on the labels.

19. The non-transitory computer-readable medium of claim 18, comprising code configured to direct a processor to generate an uncertainty value for each of the instances based, at least in part, on an instance feature and provide a second case to the trainer based, at least in part, on the uncertainty value.

20. The non-transitory computer-readable medium of claim 18, comprising code configured to direct a processor to generate a score for each instance based, at least in part, on an instance feature and flag an unlabeled instance as belonging to a target class based, at least in part, on the score.

* * * * *

UNITED STATES PATENT AND TRADEMARK OFFICE
CERTIFICATE OF CORRECTION

PATENT NO.         : 8,355,997 B2
APPLICATION NO.    : 12/618159
DATED              : January 15, 2013
INVENTOR(S)        : Evan R. Kirshenbaum et al.

Page 1 of 1

It is certified that error appears in the above-identified patent and that said Letters Patent is hereby corrected as shown below:

In column 16, line 28, in Claim 15, delete "that that" and insert -- that --, therefor.

Signed and Sealed this
Ninth Day of April, 2013

Teresa Stanek Rea
*Acting Director of the United States Patent and Trademark Office*